US012767812B2

(12) United States Patent
Joe et al.

(10) Patent No.: US 12,767,812 B2
(45) Date of Patent: Oct. 20, 2026

(54) THERMOPLASTIC RESIN COMPOSITION AND MOLDED ARTICLE THEREOF

(71) Applicant: LG CHEM, LTD., Seoul (KR)

(72) Inventors: Wangrae Joe, Daejeon (KR); Daeun Sung, Daejeon (KR); Tae Hoon Kim, Daejeon (KR); Chun Ho Park, Daejeon (KR); Yong Hee An, Daejeon (KR); Jeongmin Jang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 862 days.

(21) Appl. No.: 17/762,264

(22) PCT Filed: Dec. 21, 2020

(86) PCT No.: PCT/KR2020/018813
§ 371 (c)(1),
(2) Date: Mar. 21, 2022

(87) PCT Pub. No.: WO2022/019411
PCT Pub. Date: Jan. 27, 2022

(65) Prior Publication Data

US 2022/0411623 A1 Dec. 29, 2022

(30) Foreign Application Priority Data

Jul. 23, 2020 (KR) ........................ 10-2020-0091652
Dec. 18, 2020 (KR) ........................ 10-2020-0178406

(51) Int. Cl.
*C08L 51/04* (2006.01)
*C08L 25/12* (2006.01)
*C08L 25/16* (2006.01)
*C08L 33/10* (2006.01)

(52) U.S. Cl.
CPC ............... *C08L 51/04* (2013.01); *C08L 25/12* (2013.01); *C08L 25/16* (2013.01); *C08L 33/10* (2013.01)

(58) Field of Classification Search
CPC .......... C08L 51/04; C08L 25/12; C08L 25/16; C08L 33/10
See application file for complete search history.

(56) References Cited

U.S. PATENT DOCUMENTS

2003/0153710 A1 8/2003 Shin et al.
2007/0154708 A1 7/2007 Wilson et al.
2010/0075165 A1 3/2010 Cho et al.
2010/0331475 A1 12/2010 Hong et al.
2015/0152205 A1* 6/2015 Kim ..................... C08F 212/10 526/279
2015/0291793 A1 10/2015 Minkwiz et al.
2018/0265687 A1 9/2018 Park et al.
2019/0036083 A1 1/2019 Kim et al.
2019/0382574 A1 12/2019 An et al.
2021/0024735 A1 1/2021 Park et al.

FOREIGN PATENT DOCUMENTS

CN 107109009 A 8/2017
CN 109071912 A 12/2018
EP 2 111 427 A1 10/2009
EP 2 881 408 A1 6/2015
EP 3 438 198 A2 2/2019
KR 10-2003-0003950 A 1/2003
KR 10-2009-0029539 A 3/2009
KR 10-2009-0073978 A 7/2009
KR 10-2015-0069888 A 6/2015
KR 20150069888 A * 6/2015
KR 10-2016-0057601 A 5/2016
KR 10-2018-0050596 A 5/2018
KR 10-1919043 B1 2/2019
KR 10-2019-0073323 A 6/2019
KR 10-2019-0114898 A 10/2019
WO 2008/096976 A1 8/2008
(Continued)

OTHER PUBLICATIONS

International Search Report and Written Opinion issued in corresponding International Patent Application No. PCT/KR2020/018813, dated Apr. 16, 2021.
(Continued)

*Primary Examiner* — Robert S Jones, Jr.
*Assistant Examiner* — Joshua Caleb Bledsoe
(74) *Attorney, Agent, or Firm* — Morgan, Lewis & Bockius LLP

(57) ABSTRACT

The present disclosure relates to a thermoplastic resin composition and a molded article including the same. More particularly, the present disclosure relates to a thermoplastic resin composition including 100 parts by weight of a styrene-based resin and 1 to 10 parts by weight of a surface modifier and having a skewness (Rsk) of 0.65 to 1.35 and a molded article including the thermoplastic resin composition. In addition, the present disclosure provides a thermoplastic resin composition that is capable of imparting a rough feeling to the surface of a product and has excellent weather resistance while maintaining mechanical properties and processability equal or superior to those of conventional ASA resins; and a molded article including the thermoplastic resin composition. In particular, due to these properties of the thermoplastic resin composition, a product manufactured using the thermoplastic resin composition may have a luxurious appearance without an artificial plastic feel.

15 Claims, 2 Drawing Sheets

(56) References Cited

FOREIGN PATENT DOCUMENTS

WO 2018/084558 A2 5/2018

OTHER PUBLICATIONS

Office Action issued in corresponding Chinese Patent Application No. 202080069394.X, dated Dec. 28, 2022.

First Office Action issued in corresponding Japanese Patent Application No. 2022-523225, dated Jun. 5, 2023.

First Office Action issued in corresponding Korean Patent Application No. 10-2020-0178406, dated Jun. 27, 2023 Note: KR 10-2009-0029539 and KR 10-2015-0069888 cited therein are already of record.

Extended European Search Report issued in corresponding European Patent Application No. 20945782.9, dated Oct. 31, 2022.

* cited by examiner

[FIG. 1]
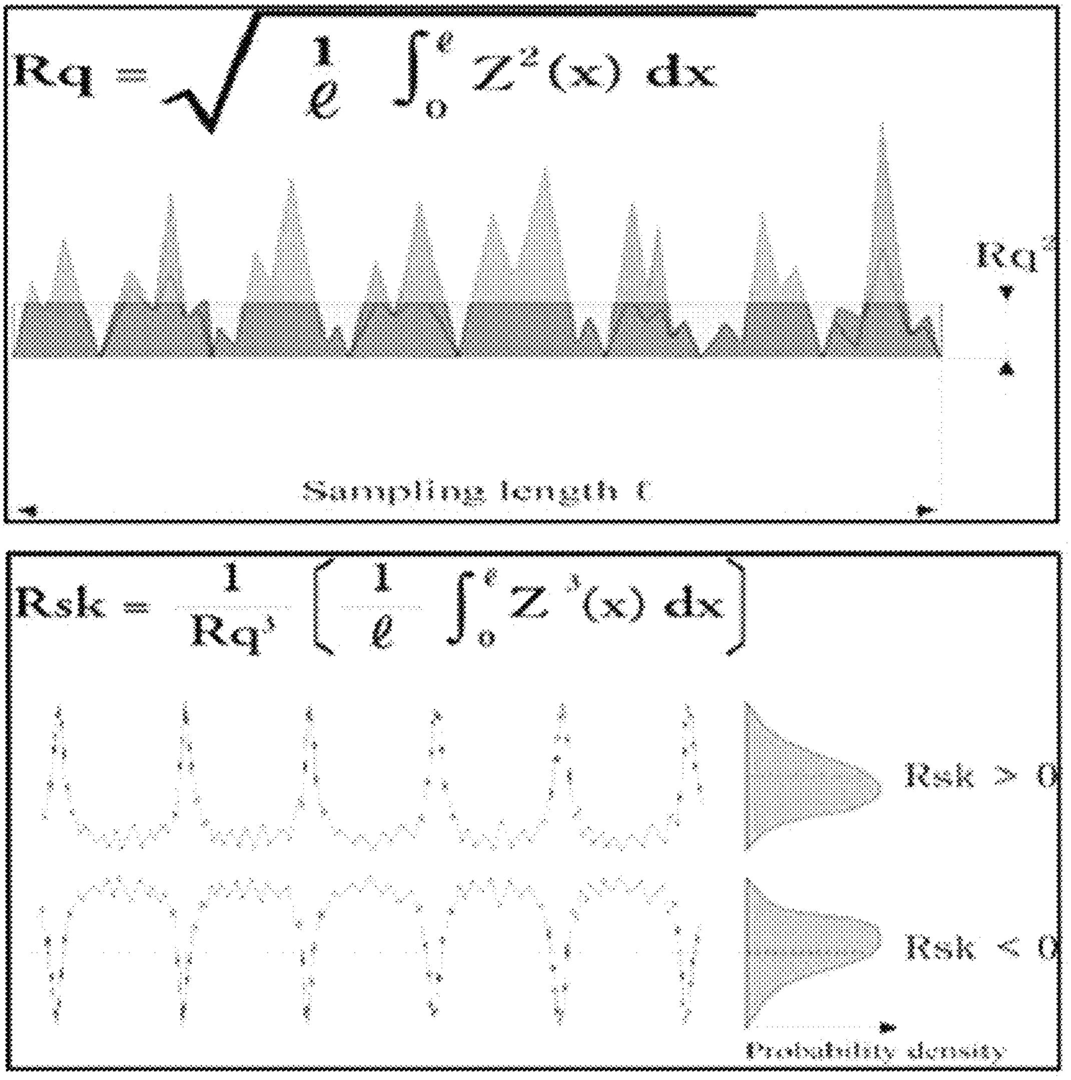

[FIG. 2]
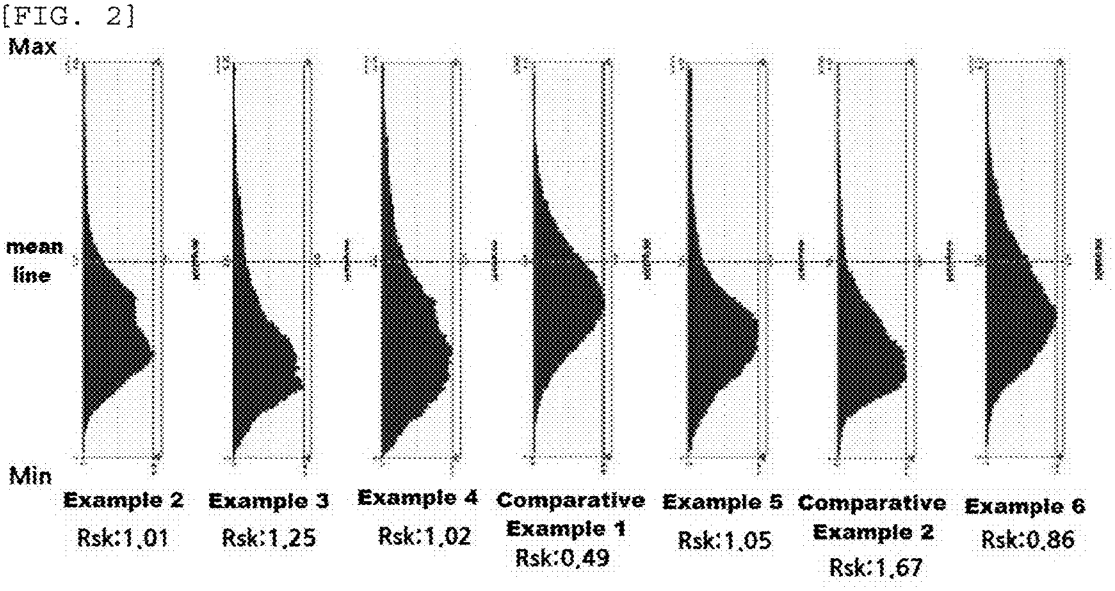
[FIG. 3]
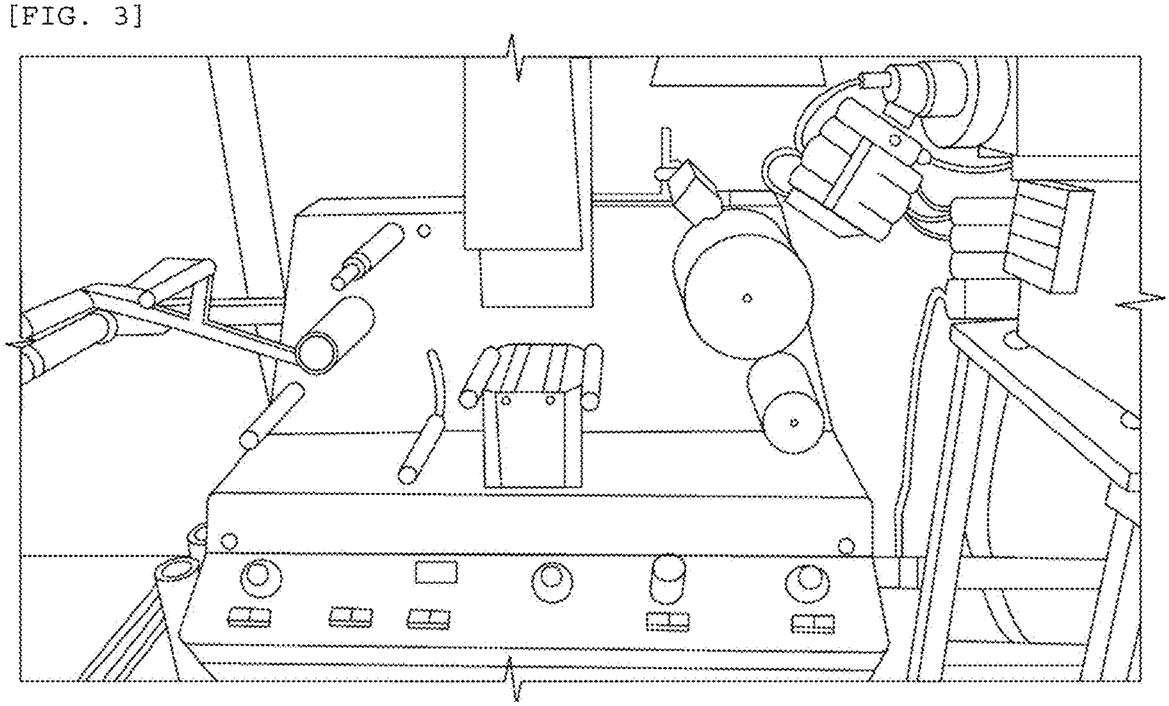

THERMOPLASTIC RESIN COMPOSITION AND MOLDED ARTICLE THEREOF

CROSS-REFERENCE TO RELATED APPLICATIONS

This application claims priority to Korean Patent Application No. 10-2020-0091652, filed on Jul. 23, 2020, and Korean Patent Application No. 10-2020-0178406, re-filed on Dec. 18, 2020, based on the priority of the above patent, in the Korean Intellectual Property Office, the disclosures of each of which are incorporated herein by reference.

TECHNICAL FIELD

The present invention relates to a thermoplastic resin composition and a molded article including the same. More particularly, the present invention relates to a thermoplastic resin composition that is capable of imparting a rough feeling to the surface of a product and has excellent weather resistance while maintaining mechanical properties and processability equal or superior to those of conventional ASA resins; and a molded article including the thermoplastic resin composition. In particular, due to these properties of the thermoplastic resin composition, a product manufactured using the thermoplastic resin composition may have a luxurious appearance without an artificial plastic feel.

BACKGROUND ART

Acrylate compound-styrene-acrylonitrile copolymers (hereinafter referred to as "ASA resins") have excellent weather resistance, aging resistance, chemical resistance, rigidity, impact resistance, and processability, and thus have been used in various fields, such as automobiles, miscellaneous goods, and construction materials.

Recently, there is increasing demand for ASA resin products having a luxurious appearance. Accordingly, ASA resin products with a surface exhibiting a rough feeling need to be developed.

However, to date, research on ASA resins with a surface exhibiting a rough feeling is insufficient. In particular, in ASA resins, surface roughness is less related to surface gloss, and thus conventional research on low-gloss resins using gloss measurement methods has limitations in realizing a surface texture exhibiting a rough feeling.

RELATED ART DOCUMENTS

Patent Documents

KR 2003-0003950 A (Jan. 14, 2003)

DISCLOSURE

Technical Problem

Therefore, the present invention has been made in view of the above problems, and it is one object of the present invention to provide a thermoplastic resin composition that is capable of imparting a rough feeling to the surface of a product and has excellent weather resistance while maintaining mechanical properties and processability equal or superior to those of conventional ASA resins; and a molded article including the thermoplastic resin composition. In particular, due to these properties of the thermoplastic resin composition, a product manufactured using the thermoplastic resin composition may have a luxurious appearance without an artificial plastic feel.

The above and other objects can be accomplished by the present invention described below.

Technical Solution

In accordance with one aspect of the present invention, provided is a thermoplastic resin composition including 100 parts by weight of a styrene-based resin and 1 to 10 parts by weight of a surface modifier, wherein the thermoplastic resin composition has a skewness (Rsk) of 0.65 to 1.35.

In addition, the present invention may provide a thermoplastic resin composition including 100 parts by weight of a styrene-based resin and 1 to 10 parts by weight of a surface modifier, wherein the thermoplastic resin composition has an arithmetic mean roughness (Ra) of 0.3 to 3 μm as measured at 5 points using an optical profiler system.

In addition, the present invention may provide a thermoplastic resin composition including 100 parts by weight of a styrene-based resin and 1 to 10 parts by weight of a surface modifier, wherein the styrene-based resin includes one or more selected from the group consisting of an acrylate-aromatic vinyl compound-vinyl cyanide compound graft copolymer (a), an aromatic vinyl compound-vinyl cyanide compound copolymer (b), a heat-resistant styrene-based resin (c), and a methacrylate-aromatic vinyl compound-vinyl cyanide compound copolymer (d) and the surface modifier includes one or more selected from the group consisting of a polystyrene-based surface modifier, a nylon-based surface modifier, and a vinyl cyanide compound-conjugated diene compound-aromatic vinyl compound-based surface modifier.

In accordance with another aspect of the present invention, provided is a molded article including the thermoplastic resin composition.

Advantageous Effects

As apparent from the foregoing, the present invention advantageously provides a thermoplastic resin composition that is capable of imparting a rough feeling to the surface of a product and has excellent weather resistance while maintaining mechanical properties and processability equal or superior to those of conventional ASA resins; and a molded article including the thermoplastic resin composition. In particular, due to these properties of the thermoplastic resin composition, a product manufactured using the thermoplastic resin composition can have a luxurious appearance without an artificial plastic feel.

DESCRIPTION OF DRAWINGS

FIG. 1 schematically shows the definition, calculation method, and meaning of skewness (Rsk) according to the present invention. The skewness (Rsk) is defined as a characteristic value representing the direction and degree of asymmetry with respect to an average value in the histogram of a statistical group, and through the skewness (Rsk), it is possible to evaluate which of peaks and valleys most of a surface comprises. In particular, in the upper image of FIG. 1, an equation for obtaining a root mean square deviation (Rq) and a graph showing the meaning thereof are shown. Z denotes the height of a peak, and denotes an average section length (sampling length). In addition, in the lower image of FIG. 1, an equation for obtaining skewness (Rsk) and a graph showing the meaning thereof are shown. As a skewness (Rsk) value is greater than 0 and increases, the distribution of peaks, on a basis of a mean line, increases. As a skewness (Rsk) value is less than 0 and decreases, the distribution of valleys, on a basis of a mean line, increases. According to the present invention, when a skewness (Rsk) is adjusted within a predetermined range, the surface of a product exhibiting a rough feeling without a plastic feel may be implemented.

FIG. 2 includes histograms for the skewness (Rsk) of 0.15 T film samples manufactured using thermoplastic resin compositions prepared in Examples and Comparative Examples. The Y axis corresponds to height. With respect to the average line, the upper part corresponds to the depth of a valley, and the lower part corresponds to the height of a peak. Here, as the peak distribution increases, the Rsk value becomes greater than 0, and as the valley distribution increases, the Rsk value becomes less than 0. More specifically, the Rsk values of Examples 2 to 7 are within the range of the present invention, and thus the surface of a product exhibiting a rough feeling without a plastic feel is implemented. However, in the case of Comparative Example 1, the number and distribution area of peaks are small, and thus surface roughness is not well realized. In addition, in the case of Comparative Example 2, the number and distribution area of peaks are too large, and thus surface roughness is not well realized.

FIG. 3 shows a film extruder used in Examples and Comparative Examples.

BEST MODE

Hereinafter, a thermoplastic resin composition and a molded article including the same according to the present invention will be described in detail.

The present inventors conducted studies to develop an ASA resin product having a luxurious appearance based on a rough feeling without an artificial plastic feel. As a result of such studies, it was confirmed that, when a predetermined styrene-based resin, a predetermined surface modifier, and the like were mixed in specific contents and a skewness (Rsk) value was adjusted within a predetermined range, a manufactured ASA resin product had excellent weather resistance without deterioration in mechanical properties and processability, and the ASA resin product had a luxurious appearance without an artificial plastic feel due to the surface thereof exhibiting a rough feeling. Based on these results, the present inventors conducted further studies to complete the present invention.

The thermoplastic resin composition of the present invention includes 100 parts by weight of a styrene-based resin and 1 to 10 parts by weight of a surface modifier, and has a skewness (Rsk) of 0.65 to 1.35. In this case, weather resistance may be excellent while maintaining mechanical properties and processability equal or superior to those of conventional ASA-based resins. In particular, a rough feeling may be imparted to the surface of a product, thereby providing a product having a luxurious appearance without an artificial plastic feel. Here, as can be seen from the results of Table 1 below, skewness (Rsk) is an independent parameter that is not related with gloss or roughness (Ra), and is closely combined with configurations according to the present invention to achieve the objects of the present invention.

The skewness (Rsk) is preferably 0.7 to 1.3, more preferably 0.8 to 1.3, still more preferably 0.9 to 1.3, most preferably 1.0 to 1.25. Within this range, weather resistance may be excellent without deterioration in mechanical properties and processability, and a rough feeling may be imparted to the surface of a product, thereby providing a product having a luxurious appearance without an artificial plastic feel.

In addition, the thermoplastic resin composition of the present invention includes 100 parts by weight of a styrene-based resin and 1 to 10 parts by weight of a surface modifier, and has an arithmetic mean roughness (Ra) of 0.3 to 3 μm as measured at 5 points using an optical profiler system. In this case, the thermoplastic resin composition may impart a rough feeling to the surface of a product and have excellent weather resistance while maintaining mechanical properties and processability equal or superior to those of conventional ASA resins. In particular, due to these properties of the thermoplastic resin composition, a product manufactured using the thermoplastic resin composition may have a luxurious appearance without an artificial plastic feel.

The styrene-based resin preferably includes one or more selected from the group consisting of an acrylate-aromatic vinyl compound-vinyl cyanide compound graft copolymer (a), an aromatic vinyl compound-vinyl cyanide compound copolymer (b), a heat-resistant styrene-based resin (c), a methacrylate-aromatic vinyl compound-vinyl cyanide compound copolymer (d), and a polyalkyl methacrylate (e).

In addition, the thermoplastic resin composition of the present invention preferably includes a lubricant, an antioxidant, and a UV stabilizer. In this case, an ASA resin product with a surface having a rough feeling may be implemented, mechanical properties may be excellent, and the desired effects of each component may be well expressed.

In addition, the thermoplastic resin composition of the present invention includes 100 parts by weight of a styrene-based resin and 1 to 10 parts by weight of a surface modifier. In this case, the styrene-based resin includes one or more selected from the group consisting of an acrylate-aromatic vinyl compound-vinyl cyanide compound graft copolymer (a), an aromatic vinyl compound-vinyl cyanide compound copolymer (b), a heat-resistant styrene-based resin (c), a methacrylate-aromatic vinyl compound-vinyl cyanide compound copolymer (d), and a polyalkyl methacrylate (e), and the surface modifier includes one or more selected from the group consisting of a polystyrene-based surface modifier, a nylon-based surface modifier, and a vinyl cyanide compound-conjugated diene compound-aromatic vinyl compound-based surface modifier. In this case, weather resistance may be excellent while maintaining mechanical properties and processability equal or superior to those of conventional ASA-based resins. In particular, a rough feeling may be imparted to the surface of a product, thereby providing a product having a luxurious appearance without an artificial plastic feel.

The styrene-based resin preferably includes 30 to 70% by weight of the acrylate-aromatic vinyl compound-vinyl cyanide compound graft copolymer (a), 0 to 30% by weight of the aromatic vinyl compound-vinyl cyanide compound copolymer (b), 0 to 30% by weight of the heat-resistant styrene-based resin (c), 30 to 70% by weight of the methacrylate-aromatic vinyl compound-vinyl cyanide compound copolymer (d), and 0 to 40% by weight of the polyalkyl methacrylate (e). Within this range, mechanical properties and weather resistance may be maintained, and a rough feeling may be imparted to the surface of a product, thereby providing a product having a luxurious appearance without an artificial plastic feel.

Hereinafter, each component constituting the thermoplastic resin composition of the present invention will be described in detail as follows.

a) Acrylate-Aromatic Vinyl Compound-Vinyl Cyanide Compound Graft Copolymer

The acrylate-aromatic vinyl compound-vinyl cyanide compound graft copolymer (a) is preferably included in an amount of 30 to 70% by weight, more preferably 30 to 60% by weight, still more preferably 40 to 60% by weight, still even more preferably 45 to 55% by weight, most preferably 50 to 55% by weight. Within this range, weather resistance, fluidity, tensile strength, and impact strength may be excellent.

The acrylate-aromatic vinyl compound-vinyl cyanide compound graft copolymer (a) preferably includes one or more selected from the group consisting of an acrylate-aromatic vinyl compound-vinyl cyanide compound graft copolymer (i) including 40 to 60% by weight of acrylate rubber having an average particle diameter of 0.3 to 0.5 μm, 20 to 40% by weight of an aromatic vinyl compound, and 10 to 20% by weight of a vinyl cyanide compound and an acrylate-aromatic vinyl compound-vinyl cyanide compound graft copolymer (ii) including 40 to 60% by weight of acrylate rubber having an average particle diameter of 0.05 μm or more and less than 0.3 μm, 20 to 40% by weight of an aromatic vinyl compound, and 10 to 20% by weight of a vinyl cyanide compound.

The weight ratio (i:ii) of the acrylate-aromatic vinyl compound-vinyl cyanide compound graft copolymer (i) to the acrylate-aromatic vinyl compound-vinyl cyanide compound graft copolymer (ii) is preferably 1:0.3 to 0.9, more preferably 1:0.4 to 0.8, still more preferably 1:0.5 to 0.7, most preferably 1:0.6 to 0.7. Within this range, an ASA resin product with a surface having a rough feeling may be implemented, and weather resistance, fluidity, tensile strength, and impact strength may be excellent.

i) Acrylate-Aromatic Vinyl Compound-Vinyl Cyanide Compound Graft Copolymer

The average particle diameter of acrylate rubber contained in the graft copolymer (i) is preferably 0.3 to 0.5 μm, more preferably 0.35 to 0.5 μm, still more preferably 0.35 to 0.45 μm, still even more preferably 0.40 to 0.45 μm. Within this range, weather resistance may be good, and mechanical properties such as fluidity, tensile strength, and impact strength may be excellent.

In this description, the average particle diameter may be measured by dynamic light scattering, and specifically, may be measured as an intensity value using a Nicomp 380 particle size analyzer (manufacturer: PSS) in a Gaussian mode.

In addition, in this description, the average particle diameter may be an arithmetic average particle diameter in a particle size distribution measured by dynamic light scattering, specifically, a scattering intensity average particle diameter. As a specific measurement example, a sample may be prepared by diluting 0.1 g of latex (TSC: 35 to 50 wt %) 1,000 to 5,000 times with distilled water, and average particle diameter may be measured using flow cells in an auto-dilution manner and in a mode of dynamic light scattering/intensity 300 kHz/intensity-weight Gaussian analysis. In this case, temperature, measurement wavelength, and channel width may be set to 23° C., 632.8 nm, and 10 μsec, respectively.

For example, based on the total weight of the styrene-based resin, the graft copolymer (i) may be included in an amount of 20 to 40% by weight, preferably 25 to 35% by weight, more preferably 30 to 35% by weight. Within this range, weather resistance, fluidity, tensile strength, and impact strength may be excellent.

For example, the graft copolymer (i) may include 40 to 60% by weight of acrylate rubber having an average particle diameter of 0.3 to 0.5 μm, 20 to 45% by weight of an aromatic vinyl compound, and 10 to 20% by weight of a vinyl cyanide compound, preferably 40 to 60% by weight of acrylate rubber having an average particle diameter of 0.3 to 0.5 μm, 25 to 45% by weight of an aromatic vinyl compound, and 10 to 20% by weight of a vinyl cyanide compound, more preferably 45 to 55% by weight of acrylate rubber having an average particle diameter of 0.3 to 0.5 μm, 30 to 40% by weight of an aromatic vinyl compound, and 10 to 20% by weight of a vinyl cyanide compound. Within this range, weather resistance, fluidity, tensile strength, and impact strength may be excellent.

In this description, a polymer including a compound refers to a polymer prepared by polymerizing the compound, and a unit in the polymerized polymer is derived from the compound.

For example, the acrylate may include one or more selected from the group consisting of alkyl acrylates containing an alkyl group having 2 to 8 carbon atoms, and is preferably an alkyl acrylate containing an alkyl group having 4 to 8 carbon atoms, more preferably butyl acrylate or ethylhexyl acrylate.

For example, the aromatic vinyl compound may include one or more selected from the group consisting of styrene, α-methylstyrene, m-methylstyrene, p-methylstyrene, and p-tert-butylstyrene, preferably styrene.

For example, the vinyl cyanide compound may include one or more selected from the group consisting of acrylonitrile, methacrylonitrile, ethylacrylonitrile, and isopropylacrylonitrile, preferably acrylonitrile.

For example, the graft copolymer (i) may be prepared by emulsion polymerization. In this case, weather resistance, fluidity, tensile strength, and impact strength may be excellent.

Emulsion polymerization commonly practiced in the art to which the present invention pertains may be used in the present invention without particular limitation.

ii) Acrylate-Aromatic Vinyl Compound-Vinyl Cyanide Compound Graft Copolymer

The average particle diameter of acrylate rubber contained in the graft copolymer (ii) is preferably 0.05 μm or more and less than 0.3 μm, more preferably 0.05 to 0.25 μm, still more preferably 0.05 to 0.15 μm, still even more preferably 0.08 to 0.12 μm. Within this range, a thermoplastic resin composition having excellent weather resistance, colorability, impact strength, chemical resistance, and surface gloss may be prepared.

For example, the graft copolymer (ii) may be included in an amount of 10 to 30% by weight, preferably 15 to 25% by weight, more preferably 15 to 20% by weight. Within this range, weather resistance, fluidity, tensile strength, and impact strength may be excellent.

For example, the graft copolymer (ii) may include 40 to 60% by weight of acrylate rubber having an average particle diameter of 0.05 μm or more and less than 0.3 μm, 20 to 45% by weight of an aromatic vinyl compound, and 10 to 20% by weight of a vinyl cyanide compound, preferably 40 to 60% by weight of acrylate rubber having an average particle diameter of 0.05 μm or more and less than 0.3 μm, 25 to 45% by weight of an aromatic vinyl compound, and 10 to 20% by weight of a vinyl cyanide compound, more preferably 45 to 55% by weight of acrylate rubber having an average particle diameter of 0.05 μm or more and less than 0.3 μm, 30 to 50% by weight of an aromatic vinyl compound, and 5 to 20% by weight of a vinyl cyanide compound, still more preferably 45 to 55% by weight of acrylate rubber having an average particle diameter of 0.05 μm or more and less than 0.3 μm, 30 to 40% by weight of an aromatic vinyl compound, and 10 to 20% by weight of a vinyl cyanide compound. Within this range, weather resistance, fluidity, tensile strength, and impact strength may be excellent.

For example, the graft copolymer (ii) may be prepared by emulsion polymerization. In this case, chemical resistance, weather resistance, fluidity, tensile strength, and impact strength may be excellent.

Emulsion polymerization commonly practiced in the art to which the present invention pertains may be used in the present invention without particular limitation.

b) Aromatic Vinyl Compound-Vinyl Cyanide Compound Copolymer

The aromatic vinyl compound-vinyl cyanide compound copolymer (b) preferably includes one or more selected from the group consisting of an aromatic vinyl compound-vinyl cyanide compound copolymer having a weight average molecular weight of 100,000 to 150,000 g/mol and an aromatic vinyl compound-vinyl cyanide compound copolymer having a weight average molecular weight of greater than 150,000 g/mol and 200,000 g/mol or less. In this case, heat resistance, processability, and impact strength may be excellent.

In this description, unless defined otherwise, the weight average molecular weight may be measured using gel permeation chromatography (GPC, Waters Breeze). As a specific example, the weight average molecular weight may be measured using tetrahydrofuran (THF) as an eluate through gel permeation chromatography (GPC, Waters Breeze). In this case, weight average molecular weight is obtained as a relative value to a polystyrene standard (PS) specimen. As a specific measurement example, the weight average molecular weight may be measured under conditions of solvent: THF, column temperature: 40° C., flow rate: 0.3 ml/min, sample concentration: 20 mg/ml, injection amount: 5 μl, column model: 1× PLgel 10 μm MiniMix-B (250×4.6 mm)+1× PLgel 10 μm MiniMix-B (250×4.6 mm)+1× PLgel 10 μm MiniMix-B Guard (50×4.6 mm), equipment name: Agilent 1200 series system, refractive index detector: Agilent G1362 RID, RI temperature: 35° C., data processing: Agilent ChemStation S/W, and test method (Mn, Mw and PDI): OECD TG 118.

Based on the total weight of the styrene-based resin, the aromatic vinyl compound-vinyl cyanide compound copolymer (b) is preferably included in an amount of 30% by weight or less, more preferably 20% by weight or less, still more preferably 10% by weight or less, still more preferably 5% by weight or less, most preferably 0% by weight. Within this range, weather resistance may be excellent.

For example, the aromatic vinyl compound-vinyl cyanide compound copolymer (b) preferably includes 65 to 80% by weight of an aromatic vinyl compound and 20 to 35% by weight of a vinyl cyanide compound. Within this range, chemical resistance and impact strength may be excellent.

For example, the aromatic vinyl compound may include one or more selected from the group consisting of styrene, m-methylstyrene, p-methylstyrene, and p-tert-butylstyrene, preferably styrene.

For example, the vinyl cyanide compound may include one or more selected from the group consisting of acrylonitrile, methacrylonitrile, ethylacrylonitrile, and isopropylacrylonitrile, preferably acrylonitrile.

For example, the aromatic vinyl polymer (b) may be prepared by suspension polymerization, emulsion polymerization, solution polymerization, or bulk polymerization. In this case, heat resistance and fluidity may be excellent.

Suspension polymerization, emulsion polymerization, solution polymerization, and bulk polymerization commonly practiced in the art to which the present invention pertains may be used in the present invention without particular limitation.

c) Heat-Resistant Styrene-Based Resin

The heat-resistant styrene-based resin (c) is preferably included in an amount of 20% by weight or less, more preferably 15% by weight or less, as a preferred example, 1 to 20% by weight, as a more preferred example, 5 to 17% by weight, as a still more preferred example, 5 to 15% by weight. Within this range, mechanical properties and heat resistance may be excellent.

The heat-resistant styrene-based resin (c) may be a styrene-based resin including a heat-resistant monomer, and is preferably an α-methylstyrene-vinyl cyanide compound copolymer. In this case, mechanical properties and heat resistance may be excellent.

The α-methylstyrene-vinyl cyanide compound copolymer preferably includes 65 to 75% by weight of α-methylstyrene and 25 to 30% by weight of a vinyl cyanide compound. Within this range, mechanical properties and heat resistance may be excellent.

As a more preferred example, the alpha-methylstyrene-acrylonitrile copolymer may include 70 to 75% by weight of alpha-methylstyrene and 25 to 30% by weight of acrylonitrile, more preferably 60 to 75% by weight of alpha-methylstyrene, 0 to 10% by weight of styrene, and 20 to 30% by weight of acrylonitrile, or may include 60 to 70% by weight of alpha-methylstyrene, 0 to 10% by weight of styrene, and 25 to 30% by weight of acrylonitrile, still more preferably 60 to 75% by weight of alpha-methylstyrene, 5 to 10% by weight of styrene, and 20 to 30% by weight of acrylonitrile, or may include 60 to 70% by weight of alpha-methylstyrene, 5 to 10% by weight of styrene, and 25 to 30% by weight of acrylonitrile. Within this range, heat resistance may be excellent.

For example, the aromatic vinyl compound may include one or more selected from the group consisting of styrene, m-methylstyrene, p-methylstyrene, and p-tert-butylstyrene, preferably styrene.

For example, the vinyl cyanide compound may include one or more selected from the group consisting of acrylonitrile, methacrylonitrile, ethylacrylonitrile, and isopropylacrylonitrile, preferably acrylonitrile.

The alpha-methylstyrene-acrylonitrile copolymer preferably has a weight average molecular weight of 80,000 to 120,000 g/mol, more preferably 80,000 to 100,000 g/mol. Within this range, heat resistance may be excellent.

For example, the heat-resistant styrene-based resin (c) may be prepared by suspension polymerization, emulsion polymerization, solution polymerization, or bulk polymerization. In this case, heat resistance and fluidity may be excellent.

Suspension polymerization, emulsion polymerization, solution polymerization, and bulk polymerization commonly practiced in the art to which the present invention pertains may be used in the present invention without particular limitation.

d) Methacrylate-Aromatic Vinyl Compound-Vinyl Cyanide Compound Copolymer

The methacrylate-aromatic vinyl compound-vinyl cyanide compound copolymer (d) preferably includes 65 to 85% by weight of a methacrylate-based monomer, 10 to 30% by weight of an aromatic vinyl compound, and 5 to 10% by weight of a vinyl cyanide compound. Within this range, weather resistance may be greatly improved, and mechanical properties may be excellent.

The methacrylate-aromatic vinyl compound-vinyl cyanide compound copolymer (d) is preferably included in an amount of 30 to 70% by weight, more preferably 35 to 60% by weight, still more preferably 40 to 55% by weight, most preferably 40 to 50% by weight. Within this range, weather resistance may be improved, and scratch resistance and colorability may be excellent.

For example, the methacrylate monomer may be an alkyl methacrylate containing an alkyl group having 1 to 15 carbon atoms. As a specific example, the methacrylate monomer may include one or more selected from the group consisting of methyl methacrylate, ethyl methacrylate, butyl methacrylate, 2-ethylbutyl methacrylate, 2-ethylhexyl methacrylate, and lauryl methacrylate, and is preferably an alkyl methacrylate containing a chain alkyl group having 1 to 4 carbon atoms, more preferably methyl methacrylate.

For example, the aromatic vinyl compound may include one or more selected from the group consisting of styrene, α-methylstyrene, m-methylstyrene, p-methylstyrene, and p-tert-butylstyrene, preferably styrene.

For example, the vinyl cyanide compound may include one or more selected from the group consisting of acrylonitrile, methacrylonitrile, ethylacrylonitrile, and isopropylacrylonitrile, preferably acrylonitrile.

The methacrylate-aromatic vinyl compound-vinyl cyanide compound copolymer (d) preferably has a weight average molecular weight of 70,000 to 200,000 g/mol, more preferably 100,000 to 150,000 g/mol, still more preferably 120,000 to 140,000 g/mol. Within this range, weather resistance, fluidity, tensile strength, and impact strength may be excellent, and due to a low surface roughness value, a soft, aesthetically pleasing effect may be implemented.

For example, the methacrylate-aromatic vinyl compound-vinyl cyanide compound copolymer (d) may be prepared by solution polymerization, bulk polymerization, emulsion polymerization, or suspension polymerization. Solution polymerization, bulk polymerization, emulsion polymerization, and suspension polymerization commonly practiced in the art to which the present invention pertains may be used without particular limitation.

e) Polyalkyl Methacrylate

For example, the polyalkyl methacrylate (e) may be included in an amount of 0 to 40% by weight, preferably 1 to 40% by weight, more preferably 10 to 40% by weight, still more preferably 20 to 40% by weight, most preferably 30 to 40% by weight. Within this range, weather resistance may be greatly improved while maintaining mechanical properties and processability equal or superior to those of conventional ASA resins.

The polyalkyl methacrylate (e) preferably includes 70 to 100% by weight of alkyl methacrylate and 0 to 30% by weight of alkylacrylate, more preferably 75 to 99% by weight of alkyl methacrylate and 1 to 25% by weight of alkylacrylate, still more preferably 80 to 98% by weight of alkyl methacrylate and 2 to 20% by weight of alkylacrylate, most preferably 84 to 98% by weight of alkyl methacrylate and 2 to 16% by weight of alkylacrylate. Within this range, weather resistance may be greatly improved while maintaining mechanical properties and processability equal or superior to those of conventional ASA resins.

For example, the alkyl methacrylate may be an alkyl methacrylate containing an alkyl group having 1 to 15 carbon atoms. As a specific example, the alkyl methacrylate may include one or more selected from the group consisting of methyl methacrylate, ethyl methacrylate, butyl methacrylate, 2-ethylbutyl methacrylate, 2-ethylhexyl methacrylate, and lauryl methacrylate, and is preferably an alkyl methacrylate containing a chain alkyl group having 1 to 4 carbon atoms, more preferably methyl methacrylate.

For example, the alkyl acrylate may include one or more selected from the group consisting of alkyl acrylates having an alkyl group having 1 to 8 carbon atoms, preferably one or more selected from the group consisting of alkyl acrylates having an alkyl group having 1 to 3 carbon atoms, more preferably methyl acrylate or ethyl acrylate.

For example, the polyalkyl methacrylate (e) may have a weight average molecular weight of 35,000 to 200,000 g/mol, preferably 50,000 to 200,000 g/mol. Within this range, weather resistance may be excellent, and fluidity, tensile strength, and impact strength may be excellent.

As another example, the polyalkyl methacrylate (e) may be a mixture of polyalkyl methacrylate (hereinafter referred to as "high-molecular weight PMMA resin") having a weight average molecular weight of 50,000 to 200,000 g/mol and polyalkyl methacrylate (hereinafter referred to as "low-molecular weight PMMA resin") having a weight average molecular weight of 35,000 to 45,000 g/mol.

For example, the weight ratio of the high-molecular weight PMMA resin to the low-molecular weight PMMA resin (high-molecular weight PMMA resin:low-molecular weight PMMA resin) may be 1:0.1 to 2.0, preferably 1:1.3 to 1.7, more preferably 1:1.4 to 1.6. Within this range, fluidity, tensile strength, impact strength, and weather resistance may be excellent, and due to a low surface roughness value, a soft, aesthetically pleasing effect may be implemented.

Surface Modifier

The surface modifier of the present invention preferably includes one or more selected from the group consisting of a nylon-based surface modifier, a polystyrene-based surface modifier, and a vinyl cyanide compound-conjugated diene compound-aromatic vinyl compound-based surface modifier. In this case, weather resistance may be excellent while maintaining mechanical properties and processability equal or superior to those of conventional ASA resins. In particular, a rough feeling may be imparted to the surface of a product, and thus the product may have a luxurious appearance without an artificial plastic feel.

As a specific example, the nylon-based surface modifier may include one or more selected from the group consisting of polyamide 6, polyamide 66 (PA 6.6), polyamide 46, polyamide 11, polyamide 12, polyamide 610, polyamide 612, polyamide 6/66, polyamide 6/612, polyamide MXD6, polyamide 6/MXD6, polyamide 66/MXD6, polyamide 6T, polyamide 6I, polyamide 6/6T, polyamide 6/6I, polyamide 66/6T, polyamide 66/6I, polyamide 6/6T/6I, polyamide 66/6T/6I, polyamide 9T, polyamide 9I, polyamide 6/9T, polyamide 6/9I, polyamide 66/9T, polyamide 6/12/9T, polyamide 66/12/9T, polyamide 6/12/9I, and polyamide 66/12/6I, preferably polyamide 66 (PA 6.6), polyamide 6 (PA 6), or a mixture thereof. In this case, weather resistance may be excellent while maintaining mechanical properties and processability equal or superior to those of conventional ASA-based resins. In particular, a rough feeling may be imparted to the surface of a product, thereby providing a product having a luxurious appearance without an artificial plastic feel.

For example, the nylon-based surface modifier preferably has a melting point of 210° C. or higher, preferably 215° C. or higher, more preferably 220° C. or higher, as a specific example, 210 to 270° C.

For example, the nylon-based surface modifier preferably has a relative viscosity (96% sulfuric acid solution) of 2.0 to 4.0, preferably 2.0 to 3.5, more preferably 2.0 to 3.0, still more preferably 2.4 to 2.7.

In this description, relative viscosity may be measured using an Ubbelohde viscometer by a sulfuric acid method according to ISO 307.

The polystyrene-based surface modifier preferably includes one or more selected from the group consisting of glass fiber-reinforced SPS, flame retardant SPS, nylon-containing SPS, blended SPS, copolymerized SPS, and homopolymer SPS, more preferably homopolymer SPS. In this case, weather resistance may be excellent while maintaining mechanical properties and processability equal or superior to those of conventional ASA resins. In particular, a rough feeling may be imparted to the surface of a product, and thus the product may have a luxurious appearance without an artificial plastic feel.

In this description, the homopolymer SPS means syndiotactic polystyrene not containing a copolymer, and homopolymer SPS commonly used in the art to which the present invention pertains may be used without particular limitation.

The shapes of particles included in the vinyl cyanide compound-conjugated diene compound-aromatic vinyl compound-based surface modifier may not be the same, and the vinyl cyanide compound-conjugated diene compound-aromatic vinyl compound-based surface modifier preferably has a particle diameter distribution of 5 μm or more, more preferably 5 to 20 μm, still more preferably 10 to 20 μm. Within this range, a rough surface and excellent physical properties such as impact strength may be implemented.

The particle diameter distribution is a particle diameter distribution for secondary particles formed as a result of aggregation of primary particles having an average particle diameter of 300 to 800 nm. The particle diameter distribution is affected by film extrusion temperature. As the particle diameter distribution value increases, the degree of roughness on the surface of an ASA product increases.

In this description, particle diameter distribution may be measured by a TEM method.

For example, based on 100 parts by weight of the styrene-based resin, the surface modifier may be included in an amount of 1 to 10 parts by weight, preferably 1 to 8 parts by weight, more preferably 1 to 6 parts by weight, still more preferably 1 to 5 parts by weight, most preferably 3 to 5. Within this range, a rough feeling may be imparted to the surface of an ASA product, and physical property balance may be excellent.

Methods of preparing a surface modifier commonly practiced in the art to which the present invention pertains may be used to prepare the surface modifier of the present invention without particular limitation, and commercially available surface modifiers may be used when the commercially available surface modifiers conform to the definition of the surface modifier according to the present invention.

Additional Additives

The thermoplastic resin composition of the present invention preferably includes a lubricant, an antioxidant, and a UV stabilizer.

Based on 100 parts by weight of the styrene-based resin, the lubricant is preferably included in an amount of 0.3 to 2 parts by weight, more preferably 1 to 2 parts by weight, still more preferably 1.2 to 1.7 parts by weight. Within this range, a surface having a rough feeling may be implemented, and impact strength and fluidity may be excellent.

The lubricant preferably includes one or more selected from the group consisting of an ester-based lubricant, a metal salt-based lubricant, a carboxylic acid-based lubricant, a hydrocarbon-based lubricant, and an amide-based lubricant, more preferably an amide-based lubricant, still more preferably a stearamide-based lubricant, most preferably alkylene bis(stearamide) containing alkylene having 1 to 10 carbon atoms. In this case, a surface having a rough feeling may be implemented, and impact strength and fluidity may be excellent.

In this description, the stearamide-based lubricant may include stearamide and a stearamide substituent in which at least one hydrogen of stearamide is substituted with another substituent.

Ester-based lubricants, metal salt-based lubricants, carboxylic acid-based lubricants, hydrocarbon-based lubricants, and amide-based lubricants commonly used in the art to which the present invention pertains may be used in the present invention without particular limitation.

The antioxidant preferably includes one or more selected from the group consisting of a phenolic antioxidant and a phosphorus antioxidant, more preferably a mixture of a phenolic antioxidant and a phosphorus antioxidant.

Based on 100 parts by weight of the styrene-based resin, each of the phenolic antioxidant and phosphorus antioxidant is preferably included in an amount of 0.05 to 1.5 parts by weight, more preferably 0.1 to 1.0 part by weight, still more preferably 0.2 to 0.5 parts by weight. Within this range, a surface having a rough feeling may be implemented, and antioxidative effect may be excellent.

The phenolic antioxidant preferably includes one or more selected from tetrakis[ethylene-3-(3,5-di-t-butyl-hydroxy phenyl)propionate] (IR-1010), octadecyl 3-(3,5-di-t-butyl-4-hydroxyphenyl)propionate (IR-1076), pentaerythritol tetrakis[3-(3,5-di-t-butyl-4-hydroxyphenyl)propionate], and 1,3,5-trimethyl-2,4,6-tris(3,5-di-t-butyl-4-hydroxybenzil) benzene, more preferably octadecyl 3-(3,5-di-t-butyl-4-hydroxyphenyl)propionate (IR-1076). In this case, a surface having a rough feeling may be implemented, and antioxidative effect may be excellent.

The phosphorus antioxidant preferably includes one or more selected from the group consisting of tris(2,4-di-tert-butylphenyl) phosphite, tris(nonylphenyl) phosphite (TNPP), and di-(2,4-di-tert-butylphenyl) pentaerythritol diphosphite, more preferably tris(2,4-di-tert-butylphenyl) phosphite. Within this range, a surface having a rough feeling may be implemented, and antioxidative effect may be excellent.

The UV stabilizer preferably includes one or more selected from the group consisting of a benzotriazole-based UV stabilizer and a HALS-based UV stabilizer, more preferably a mixture of a benzotriazole-based UV stabilizer and a HALS-based UV stabilizer.

Based on 100 parts by weight of the styrene-based resin, the UV stabilizer preferably includes 0.1 to 1.0 part by weight of a benzotriazole-based UV stabilizer and 0.1 to 1.0 part by weight of a HALS-based UV stabilizer, more preferably 0.2 to 0.7 parts by weight of a benzotriazole-based UV stabilizer and 0.2 to 0.7 parts by weight of a HALS-based UV stabilizer, still more preferably 0.3 to 0.6 parts by weight of a benzotriazole-based UV stabilizer and 0.3 to 0.6 parts by weight of a HALS-based UV stabilizer. Within this range, a surface having a rough feeling may be implemented, and light resistance may be excellent.

For example, the benzotriazole-based UV stabilizer may be a hydroxybenzotriazole-based compound, preferably a 2-(2'-hydroxyphenyl)benzotriazole-based compound, and more preferably includes one or more selected from the group consisting of 2-(2'-hydroxy-5'-methylphenyl)benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chlorobenzotriazole, 2-(3'-tert-butyl-2'-hydroxy-5'-methylphenyl-5-chlorobenzotriazole), 2-(3'-sec-butyl-5'-tert-butyl-2'-hydroxyphenyl)benzotriazole, 2-(2'-hydroxy-4'-octyloxyphenyl) benzotriazole, 2-(3',5'-di-tert-amyl-2'-hydroxyphenyl) benzotriazole, 2-(3',5'-bis(α,α-dimethylbenzyl)-2'-hydroxyphenyl)benzotriazole, 2-(3'-tert-butyl-2'-hydroxy-5'-(2-octyloxy-carbonylethyl)phenyl)-5-chlorobenzotriazole, 2-(3'-tert-butyl-5'-[2-(2-ethylhexyloxy)carbonylethyl]-2'-hydroxyphenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl) phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl) benzotriazole, 2-(3'-dodecyl-2'-hydroxy-5'-methylphenyl) benzotriazole, 2-(3'-tert-butyl-2'-hydroxy-5'-(2-isooctyloxycarbonylethyl)phenylbenzotriazole, 2,2'-methylenebis[4-(1,1,3,3-tetramethylbutyl)-6-benzotriazole-2-ylphenol], and a transesterification product of 2-[3'-tert-butyl-5'-(2-methoxycarbonylethyl)-2'-hydroxyphenyl]-2H-benzotriazole and polyethyleneglycol. Within this range, a surface having a rough feeling may be implemented, and light resistance may be excellent.

The HALS-based UV stabilizer preferably includes one Or more selected from the group consisting of 1,1-bis(2,2,6,6-tetramethyl-4-piperidyl)succinate, bis(2,2,6,6-tetramethyl-4-piperidyl)sebacate, bis(1,2,2,6,6-pentamethyl-4-piperidyl)sebacate, bis(1-octyloxy-2,2,6,6-tetramethyl-4-piperidyl)sebacate, bis(1,2,2,6,6-pentamethyl-4-piperidyl)-N-butyl-3,5-di-tert-butyl-4-hydroxybenzilmalonate, a condensation product of 1-(2-hydroxyethyl)-2,2,6,6-tetramethyl-4-hydroxypiperidine and succinic acid, a linear or cyclic condensation product of N,N'-bis(2,2,6,6-tetramethyl-4-piperidyl)hexamethylene diamine and 4-tert-octylamino-2,6-di-chloro-1,3,5-triazine, tris(2,2,6,6-tetramethyl-4-piperidyl)nitrilotriacetate, tetrakis(2,2,6,6-tetramethyl-4-piperidyl)-1,2,3,4-butane tetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, a linear or cyclic condensation product of N,N'-bis(2,2,6,6-tetramethyl-4-piperidyl)hexamethylene diamine and 4-morpholino-2,6-dichloro-1,3,5-triazine, and a reaction product of 7,7,9,9-tetramethyl-2-cycloundecyl-1-oxa-3,8-diaza-4-oxospiro-[4,5]decane and epichlorohydrin, more preferably bis(2,2,6,6-tetramethyl-4-piperidyl)sebacate, 2-(2H-benzotriazole-2-yl)-4-(1,1,3,3-tetramethylbutyl)phenol, or a mixture thereof. Within this range, a surface having a rough feeling may be implemented, and light resistance may be excellent.

When necessary, based on 100 parts by weight of the styrene-based resin, the thermoplastic resin composition of the present invention may further include 0.01 to 5 parts by weight, 0.05 to 3 parts by weight, 0.1 to 2 parts by weight, or 0.5 to 1 part by weight of one or more selected from the group consisting of a heat stabilizer, a dye, a pigment, a colorant, a release agent, an antistatic agent, an antibacterial agent, a processing aid, a metal deactivator, a flame retardant, a smoke suppressant, an anti-dripping agent, an anti-friction agent, and an anti-wear agent. Within this range, an ASA-based resin composition having required physical properties may be implemented without deterioration in the intrinsic physical properties thereof.

Thermoplastic Resin Composition

For example, the thermoplastic resin composition of the present invention may have an average surface roughness (Ra) of 0.3 to 3 μm, preferably 0.35 to 2.8 μm, more preferably 0.35 to 2.5 μm, still more preferably 0.38 to 2.4 μm, still even more preferably 1 to 2.4 μm, most preferably 1.5 to 2.4 μm as measured at 5 points using an optical profiler system. Within this range, weather resistance may be excellent without deterioration in mechanical properties and processability, and a product having a luxurious appearance without an artificial plastic feel may be provided.

For example, the thermoplastic resin composition may have a melt index (MI) of 4 to 15 g/10 min, preferably 10 to 15 g/10 min as measured at 220° C. under 10 kg according to ASTM D-1238. Within this range, processability and physical property balance may be excellent.

For example, the thermoplastic resin composition preferably has an impact strength of 7 to 25 kg·cm/cm as measured using a specimen having a thickness of ¼ inch according to ASTM 256. Within this range, impact strength and physical property balance may be excellent.

A method of preparing the thermoplastic resin composition of the present invention preferably comprises a step of mixing 100 parts by weight of a styrene-based resin and 1 to 10 parts by weight of a surface modifier and preparing pellets at 220 to 280° C. using an extrusion kneader, wherein the thermoplastic resin composition has a skewness (Rsk) of 0.65 to 1.35. In this case, mechanical properties and processability may be maintained to be equal or superior to those of conventional ASA resins, and excellent weather resistance and surface gloss, low gloss, and low surface roughness value may be realized, thereby providing an ASA resin product having a soft feel.

In addition, the method of preparing the thermoplastic resin composition of the present invention preferably comprises a step of mixing 100 parts by weight of a styrene-based resin and 1 to 10 parts by weight of a surface modifier and preparing pellets at 220 to 280° C. using an extrusion kneader, wherein the thermoplastic resin composition has an arithmetic mean roughness (Ra) of 0.3 to 3 μm as measured at 5 points using an optical profiler system. In this case, mechanical properties and processability may be maintained to be equal or superior to those of conventional ASA resins, and excellent weather resistance and surface gloss, low gloss, and low surface roughness value may be realized, thereby providing a soft feel.

In addition, the method of preparing the thermoplastic resin composition of the present invention preferably comprises a step of mixing 100 parts by weight of a styrene-based resin and 1 to 10 parts by weight of a surface modifier and preparing pellets at 220 to 280° C. using an extrusion kneader, wherein the styrene-based resin includes one or more selected from the group consisting of an acrylate-aromatic vinyl compound-vinyl cyanide compound graft copolymer (a), an aromatic vinyl compound-vinyl cyanide compound copolymer (b), a heat-resistant styrene-based resin (c), and a methacrylate-aromatic vinyl compound-vinyl cyanide compound copolymer (d), and the surface modifier includes one or more selected from the group consisting of a polystyrene-based surface modifier, a nylon-based surface modifier, and a vinyl cyanide compound-conjugated diene compound-aromatic vinyl compound-based surface modifier. In this case, mechanical properties and processability may be maintained to be equal or superior to those of conventional ASA resins, and excellent weather resistance and surface gloss, low gloss, and low surface roughness value may be realized, thereby providing a soft feel.

The method of preparing the thermoplastic resin composition shares all the technical characteristics of the above-described thermoplastic resin composition. Accordingly, repeated description thereof will be omitted.

The step of preparing pellets using an extrusion kneader is preferably performed at 220 to 280° C., more preferably 240 to 280° C. In this case, the temperature is the temperature of a cylinder.

Extrusion kneaders commonly used in the art to which the present invention pertains may be used without particular limitation, and a twin-screw extrusion kneader is preferably used.

Molded Article

The molded article of the present invention includes the thermoplastic resin composition of the present invention. In this case, weather resistance may be excellent while maintaining mechanical properties and processability equal or superior to those of conventional ASA resin products, and a rough feeling may be imparted to the surface of a product, thereby providing a product having a luxurious appearance without an artificial plastic feel.

For example, the molded article may be an extrusion molded article or an injection molded article, preferably a building exterior material, more preferably a flooring material for decking or a material for roofing.

The molded article is preferably prepared by extruding or injecting the thermoplastic resin composition of the present invention at a molding temperature of 190 to 250° C. Within this range, a matte effect may excellent.

For example, the extrusion step may be performed using a film extruder.

In the description of the thermoplastic resin composition of the present invention, the method of preparing the same, and the exterior material including the same, other conditions or equipment that are not explicitly described may be appropriately selected within the range commonly practiced in the art without particular limitation.

Hereinafter, the present invention will be described in more detail with reference to the following preferred examples. However, these examples are provided for illustrative purposes only and should not be construed as limiting the scope and spirit of the present invention. In addition, it will be apparent to those skilled in the art that various changes and modifications may be made without departing from the spirit and scope of the present invention, and such changes and modifications are also within the scope of the appended claims.

EXAMPLES

Materials used in Examples 1 to 7 and Comparative Examples 1 and 2 below are as follows.

A-1) Small-diameter ASA resin containing butyl acrylate rubber having an average particle diameter of 100 nm A-2) Large-diameter ASA resin containing butyl acrylate rubber having an average particle diameter of 400 nm B-1) SAMMA resin (XT500, weight average molecular weight: 80,000 g/mol, LG Chemical Co.)

B-2) SAMMA resin (XT510, weight average molecular weight: 130,000 g/mol, LG Chemical Co.)

C-1) SPS surface modifier (product name: 300ZC, manufacturer: IDEMITSU Co.)

C-2) Nylon66 (product name: poly amide N66 U4800, manufacturer: INVISTA Co.)

C-3) Nylon6 (product name: poly amide N6 EN300, manufacturer: KPCHEMTECH Co.)

C-4) MA210 (product name: MA210, manufacturer: LG Chemical Co.)

C-4) SL0100 (product name: SL0100, manufacturer: LOTTE Advanced Chemicals)

C-4) AM808 (product name: AM808, manufacturer: Zeon Kasei Co.)

Example 1

21 parts by weight of a small-diameter ASA resin, 32 parts by weight of a large-diameter ASA resin, 47 parts by weight of a SAMMA resin, 5 parts by weight of an SPS surface modifier, 1.5 parts by weight of EBS (SUNKOO Co.) as a lubricant, 0.5 parts by weight of octadecyl 3-(3,5-di-t-butyl-4-hydroxyphenyl)propionate and 0.5 parts by weight of tris(2,4-di-tert-butylphenyl)phosphite as antioxidants, 0.5 parts by weight of Tinuvin P (BASF Co.) as a benzotriazole-based UV stabilizer, and 0.5 parts by weight of Tinuvin770 (BASF Co.) as a HALS-based UV stabilizer were mixed, and then ASA resin composition pellets were prepared at 220° C. using the mixture and using an extrusion kneader (28 pi, L/D: 36).

A film having a uniform thickness of 0.15 T was prepared using the prepared ASA resin composition pellets and using a film extruder, the film was used as a sample, and measurement was performed according to the following methods. At this time, a single-screw extruder for sheet molding (E20T, 20 pi, L/D: 25, Collin Co.) was used as the film extruder, and temperature conditions were set as follows: barrel temperatures of 50, 200, 210, and 210° C. and die temperatures of 220, 220, and 230° C. in order from the inlet of the extruder. The pellets were sufficiently dried in an oven at 80° C. for 3 hours or more to eliminate the effect of moisture, and then were fed into the film extruder through the inlet of the film extruder to prepare a film with a uniform thickness of 0.15 T. The temperature of a rear roller was set to 85° C. using water as a medium, and as shown in FIG. 3, the roller was configured such that only one side of a resin extruded through a T-die was in contact with a roll. At this time, the screw RPM of the film extruder was fixed to 100, and the linear velocity of the roll was adjusted so that the film had a thickness of 0.15 T. At this time, the skewness (Rsk), the surface roughness value (Ra), and the film gloss of a surface in contact with the first roll among extruded film surfaces were measured. In addition, sensory evaluation of surface roughness was performed. For reference, when measuring with a surface not in contact with the first roll, a difference may occur in surface roughness.

In addition, the prepared ASA resin composition pellets were injected under conditions of injection temperatures (based on inlet) of 200, 210, 210, and 220° C., a mold temperature of 60° C., a holding pressure of 3 bar, and an injection rate of 80 bar to obtain specimens, and the melt index and Izod impact strength of the specimens were measured according to the following measurement methods.

Examples 2 to 7 and Comparative Examples 1 and 2

Procedures were performed in the same manner as in Example 1, except that the content and type of a SPS surface modifier are used as shown in Table 1 below.

Test Examples

The properties of 0.15 T films prepared in Examples 1 to 7 and Comparative Examples 1 and 2 were measured according to the following methods, and the results are shown in Table 1 below.

Skewness (Rsk): Referring to FIG. 1, when skewness was measured, an optical profiler system (Nano View NV-2700, Nano System Co.) was used, and scanning was performed for a range of ±40 μm under conditions of a WSI Envelope mode and objective lens (20×)× ocular lens (1×). At this time, a sample was fixed flat on a stage, and measurement was performed for 5 points. For the measured values, an average value for 5 points was calculated using an equation for obtaining a root mean square deviation (Rq) shown in the upper image and an equation for obtaining skewness (Rsk) shown in the lower image.

Surface roughness value (Ra): Surface roughness values for 5 points were measured using an optical profiler system (NV-2700, Nano System Co., Ltd.), and an average value of the measured surface roughness values was calculated. When the surface roughness value is low, texture is smooth and gloss is even when touched by hand.

Film gloss: Film gloss was measured at 60° using a VG7000 gloss meter.

Sensory evaluation of surface roughness: When a surface was rubbed by hand, it was marked as ◎ when the surface was very rough; it was marked as ○ when the surface was rough; it was marked as Δ when the surface was slightly rough; and it was marked as X when the surface was smooth.

Melt index (MI): Melt index was measured at 220° C. under 10 kg according to ASTM D-1238.

Izod impact strength (kg/cm$^2$): Izod impact strength was measured using a specimen having a thickness of ¼ inch according to ASTM 256.

TABLE 1

| Classification | Example 1 | Example 2 | Example 3 | Example 4 | Example 5 | Example 6 | Example 7 | Comparative Example 1 | Comparative Example 2 |
|---|---|---|---|---|---|---|---|---|---|
| Surface modifier | SPS | nylon66 | nylon66 | nylon66 | MA210 | AM808 | nylon66 + nylon6 | nylon6 | SL0100 |
| Content (parts by weight) | 5 | 1 | 3 | 5 | 5 | 5 | 6 (nylon66: 4 parts by weight, nylon6: 2 parts by weight) | 5 | 5 |
| Rsk | 0.8 | 1.01 | 1.25 | 1.02 | 1.05 | 0.86 | 1.07 | 0.49 | 1.67 |
| Ra | 1.51 | 0.53 | 1.93 | 2.35 | 0.38 | 0.59 | 2.12 | 0.14 | 0.66 |
| Film gloss | 6.1 | 42.9 | 13.5 | 7.7 | 51.1 | 18 | 7 | 62.5 | 42.9 |
| Sensory evaluation of roughness | ○ | ○ | ◎ | ◎ | ○ | ○ | ○ | X | Δ |
| Melt index | 10.4 | 15.0 | 14.3 | 13.1 | 10.8 | 11.5 | 13.5 | 14.2 | 11.8 |
| Impact strength | 7.07 | 17.6 | 12.7 | 8.6 | 24.2 | 22.9 | 8.8 | 9.5 | 23.8 |

Referring to the sensory evaluation results in Table 1, in the case of the thermoplastic resin compositions (see Examples 1 to 7) having Rsk values according to the present invention, the surface of each sample exhibits a rough feeling, indicating that the sample has a luxurious appearance without an artificial plastic feel.

However, referring to the sensory evaluation results of the thermoplastic resin compositions (see Comparative Examples 1 and 2) having Rsk values outside the range according to the present invention, the surface of each sample does not exhibit a rough feeling and is smooth like that of general plastic, indicating that the sample has an appearance with an artificial plastic feel.

The invention claimed is:

1. A thermoplastic resin composition, comprising
100 parts by weight of a styrene-based resin and
3 to 6 parts by weight of a surface modifier,
wherein the surface modifier is a nylon-based surface modifier,
wherein the nylon-based surface modifier comprises polyamide 66 (PA 6.6),
wherein the thermoplastic resin composition has a skewness (Rsk) of 0.8 to 1.3,
wherein the styrene-based resin comprises one or more selected from the group consisting of an acrylate-aromatic vinyl compound-vinyl cyanide compound graft copolymer (a), and a methacrylate-aromatic vinyl compound-vinyl cyanide compound copolymer (d),
wherein the styrene-based resin is free of an aromatic vinyl compound-vinyl cyanide compound copolymer (b) consisting of an aromatic vinyl compound and a vinyl cyanide compound,
wherein the acrylate-aromatic vinyl compound-vinyl cyanide compound graft copolymer (a) comprises:
an acrylate-aromatic vinyl compound-vinyl cyanide compound graft copolymer (i) comprising:
40 to 60% by weight of acrylate rubber having an average particle diameter of 0.35 to 0.5 μm,
20 to 45% by weight of a first aromatic vinyl compound, and
10 to 20% by weight of a first vinyl cyanide compound, and
an acrylate-aromatic vinyl compound-vinyl cyanide compound graft copolymer (ii) comprising:
40 to 60% by weight of acrylate rubber having an average particle diameter of 0.05 to 0.25 μm,
20 to 40% by weight of a second aromatic vinyl compound, and
10 to 20% by weight of a second vinyl cyanide compound.

2. The thermoplastic resin composition according to claim 1, wherein a weight ratio (i:ii) of the acrylate-aromatic vinyl compound-vinyl cyanide compound graft copolymer (i) to the acrylate-aromatic vinyl compound-vinyl cyanide compound graft copolymer (ii) is 1:0.3 to 0.9.

3. The thermoplastic resin composition according to claim 1, wherein the aromatic vinyl compound-vinyl cyanide compound copolymer (b) comprises one or more selected from the group consisting of an aromatic vinyl compound-vinyl cyanide compound copolymer having a weight average molecular weight of 100,000 to 150,000 g/mol and an aromatic vinyl compound-vinyl cyanide compound copolymer having a weight average molecular weight of greater than 150,000 g/mol and 200,000 g/mol or less.

4. The thermoplastic resin composition according to claim 1, wherein the methacrylate-aromatic vinyl compound-vinyl cyanide compound copolymer (d) comprises 65 to 85% by weight of methacrylate, 10 to 30% by weight of an aromatic vinyl compound, and 5 to 10% by weight of a vinyl cyanide compound.

5. The thermoplastic resin composition according to claim 1, wherein the thermoplastic resin composition has an arithmetic mean roughness (Ra) of 0.3 to 3 μm as measured at 5 points using an optical profiler system.

6. The thermoplastic resin composition according to claim 1, further comprising a lubricant, an antioxidant, and a UV stabilizer.

7. A molded article, comprising the thermoplastic resin composition according to claim 1.

8. The molded article according to claim 7, wherein the molded article is a flooring material for decking, a material for roofing, or an exterior material for buildings.

9. The thermoplastic resin composition according to claim 1, comprising 3 to 5 parts by weight of the surface modifier.

10. The thermoplastic resin composition according to claim 1, wherein the thermoplastic resin composition has a skewness (Rsk) of 1.0 to 1.3.

11. The thermoplastic resin composition according to claim 1, wherein the thermoplastic resin composition has a skewness (Rsk) of 1.02 to 1.3, and wherein the styrene-based resin consists of:

30 to 70% by weight of the acrylate-aromatic vinyl compound-vinyl cyanide compound graft copolymer (a), 30 to 70% by weight of the methacrylate-aromatic vinyl compound-vinyl cyanide compound copolymer (d).

12. The thermoplastic resin composition according to claim 1, wherein the thermoplastic resin composition has a skewness (Rsk) of 1.07 to 1.3.

13. The thermoplastic resin composition according to claim 1, wherein the styrene-based resin comprises 30 to 70% by weight of the acrylate-aromatic vinyl compound-vinyl cyanide compound graft copolymer (a), and 30 to 70% by weight of the methacrylate-aromatic vinyl compound-vinyl cyanide compound copolymer (d).

14. The thermoplastic resin composition according to claim 1, wherein the styrene-based resin consists of the acrylate-aromatic vinyl compound-vinyl cyanide compound graft copolymer (a) and the methacrylate-aromatic vinyl compound-vinyl cyanide compound copolymer (d).

15. The thermoplastic resin composition according to claim 14, wherein the acrylate rubber present in the acrylate-aromatic vinyl compound-vinyl cyanide compound graft copolymer (i) includes butyl acrylate rubber, wherein the acrylate rubber present in the acrylate-aromatic vinyl compound-vinyl cyanide compound graft copolymer (ii) includes butyl acrylate rubber, wherein a weight ratio (i:ii) of the acrylate-aromatic vinyl compound-vinyl cyanide compound graft copolymer (i) to the acrylate-aromatic vinyl compound-vinyl cyanide compound graft copolymer (ii) is 1:0.3 to 0.9, wherein the first aromatic vinyl compound and the second aromatic vinyl compound each includes styrene, wherein the first vinyl cyanide compound and the second vinyl cyanide compound each includes acrylonitrile, and wherein the thermoplastic resin composition has a skewness (Rsk) of 1.0 to 1.3.

* * * * *